US009959481B2

(12) United States Patent
Kitamura et al.

(10) Patent No.: US 9,959,481 B2
(45) Date of Patent: May 1, 2018

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Makoto Kitamura, Hachioji (JP); Yamato Kanda, Hino (JP); Toshiya Kamiyama, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 422 days.

(21) Appl. No.: 14/830,893

(22) Filed: Aug. 20, 2015

(65) Prior Publication Data

US 2015/0356369 A1     Dec. 10, 2015

Related U.S. Application Data

(63) Continuation of application No. PCT/JP2014/050767, filed on Jan. 17, 2014.

(30) Foreign Application Priority Data

Feb. 27, 2013  (JP) ................................. 2013-037975

(51) Int. Cl.
*G06K 9/46* (2006.01)
*G06T 7/00* (2017.01)
(Continued)

(52) U.S. Cl.
CPC ................ *G06K 9/46* (2013.01); *G01B 11/14* (2013.01); *G06K 9/52* (2013.01); *G06K 9/6215* (2013.01);
(Continued)

(58) Field of Classification Search
CPC ....... G06T 7/0012; G06T 7/0014; G06T 7/90; G06T 7/50; G06T 2207/10068;
(Continued)

(56) References Cited

U.S. PATENT DOCUMENTS

| 2006/0050966 A1* | 3/2006 | Nishimura ............ G06T 7/0012 382/209 |
| 2011/0245642 A1* | 10/2011 | Minetoma ............ A61B 1/0638 600/324 |
| 2013/0064436 A1 | 3/2013 | Tanaka et al. |

FOREIGN PATENT DOCUMENTS

| JP | 2005-192880 A | 7/2005 |
| JP | 4434705 B2 | 3/2010 |
| WO | WO 2012/153568 A1 | 11/2012 |

OTHER PUBLICATIONS

International Search Report dated Apr. 8, 2014 issued in PCT/JP2014/050767.
(Continued)

*Primary Examiner* — Sean Conner
*Assistant Examiner* — Raphael Schwartz
(74) *Attorney, Agent, or Firm* — Scully, Scott, Murphy & Presser, P.C.

(57) ABSTRACT

An image processing apparatus for processing an image acquired by imaging a living body includes: a blood vessel candidate region extraction unit configured to extract a plurality of blood vessel candidate regions from the image; an identical blood vessel candidate region extraction unit configured to extract, from among the plurality of blood vessel candidate regions, a blood vessel candidate region group estimated to form a line shape when integrated, as an identical blood vessel candidate region; an evaluation value calculation unit configured to calculate one or more kinds of evaluation values for evaluating a likelihood that the identical blood vessel candidate region corresponds to an iden-
(Continued)

tical blood vessel; and a blood vessel region discrimination unit configured to discriminate whether or not the identical blood vessel candidate region forms an identical blood vessel region, based on the evaluation values.

14 Claims, 11 Drawing Sheets

(51) Int. Cl.
    *G06K 9/62*     (2006.01)
    *G06K 9/52*     (2006.01)
    *G01B 11/14*     (2006.01)
    *G06T 7/50*     (2017.01)

(52) U.S. Cl.
    CPC .............. *G06T 7/0012* (2013.01); *G06T 7/50* (2017.01); *G06K 2009/4666* (2013.01); *G06T 2207/10024* (2013.01); *G06T 2207/10068* (2013.01); *G06T 2207/30101* (2013.01)

(58) Field of Classification Search
    CPC ........... G06T 2207/30092; G06T 2207/30101; G06K 9/4652; G06K 9/46; G06K 2209/05
    See application file for complete search history.

(56) References Cited

OTHER PUBLICATIONS

English Abstract of JP 2005-157902 A, dated Jun. 16, 2005.
Suicheng, Gu, et al., "Computerized Detection of Retina Blood Vessel Using a Piecewise Line Filling Approach", Optical Sensing II, Feb. 26, 2013, p. 867021, vol. 8670.
Guang, Zeng, "Real-Time Automatic Linear Feature Detection in Images", Dec. 2008, http://tigerprints.clemson.edu/all/dissertations/291/.
Barva, M., et al., "Automatic Localization of Curvilinear Object in 3D Ultrasound Images", Optical Sensing II, Apr. 12, 2005, p. 455, vol. 5750.
Extended Supplementary European Search Report dated Oct. 24, 2016 received in Application No. / Patent No. 14757712.6-1906 / 2962624 PCT/JP2014050767.
Anonymous et al., "2013 Medical Imaging Technical Summaries—excerpts from 8670: Computer-Aided Diagnosis", 2013 Medical Imaging, Feb. 9, 2013 (Feb. 9, 2013), XP055413072.
Anonymous, 2013 Medical Imaging Technical Program, 2013 Medical Imaging, Feb. 9, 2013 (Feb. 9, 2013), XP055413070.
European Patent Office Communication dated Oct. 13, 2017 in corresponding European Application No. 14 757 712.6.

* cited by examiner

IMAGE PROCESSING APPARATUS, IMAGE PROCESSING METHOD, AND COMPUTER-READABLE RECORDING MEDIUM

CROSS-REFERENCE TO RELATED APPLICATIONS

This application is a continuation of PCT international application Ser. No. PCT/JP2014/050767 filed on Jan. 17, 2014 which designates the United States, incorporated herein by reference, and which claims the benefit of priority from Japanese Patent Application No. 2013-037975, filed on Feb. 27, 2013, incorporated herein by reference.

BACKGROUND

1. Technical Field

The disclosure relates to an image processing apparatus, an image processing method, and a computer-readable recording medium for discriminating an abnormal region in an image acquired by imaging inside of a lumen of a living body.

2. Related Art

Japanese Patent Application Laid-open No. 2005-192880 discloses a technique of detecting a lesion region from an intraluminal image as image processing performed on an image that is acquired by imaging inside of a lumen of a living body (hereinafter also referred to as the intraluminal image or simply an image) with use of a medical observation apparatus such as an endoscope or a capsule endoscope. More specifically, Japanese Patent Application Laid-open No. 2005-192880 discloses the technique of mapping a pixel value of each pixel within the intraluminal image into a feature space based on color feature data, clustering the pixel value within the feature space, identifying a normal mucous membrane cluster and an abnormal region cluster based on information such as the size and centroid coordinates of each cluster, and detecting a pixel region belonging to the abnormal region cluster as a region of abnormal finding.

Japanese Patent No. 4434705 discloses a technique of discriminating an abnormal region corresponding to redness and a bleeding point from a normal visible blood vessel. More specifically, Japanese Patent No. 4434705 discloses the technique of labeling a region detected as the abnormal region and discriminating whether or not the detected region is the visible blood vessel based on shape information of each label.

SUMMARY

In accordance with some embodiments, an image processing apparatus, an image processing method, and a computer-readable recording medium are provided.

In some embodiments, an image processing apparatus for processing an image acquired by imaging a living body includes: a blood vessel candidate region extraction unit configured to extract a plurality of blood vessel candidate regions from the image; an identical blood vessel candidate region extraction unit configured to extract, from among the plurality of blood vessel candidate regions, a blood vessel candidate region group estimated to form a line shape when integrated, as an identical blood vessel candidate region; an evaluation value calculation unit configured to calculate one or more kinds of evaluation values for evaluating a likelihood that the identical blood vessel candidate region corresponds to an identical blood vessel; and a blood vessel region discrimination unit configured to discriminate whether or not the identical blood vessel candidate region forms an identical blood vessel region, based on the evaluation values.

In some embodiments, an image processing method is executed by an image processing apparatus for processing an image acquired by imaging a living body. The method includes: a blood vessel candidate region extraction step of extracting a plurality of blood vessel candidate regions from the image; an identical blood vessel candidate region extraction step of extracting, from among the plurality of blood vessel candidate regions, a blood vessel candidate region group estimated to form a line shape when integrated, as an identical blood vessel candidate region; an evaluation value calculation step of calculating one or more kinds of evaluation values for evaluating a likelihood that the identical blood vessel candidate region corresponds to an identical blood vessel; and a blood vessel region discrimination step of discriminating whether or not the identical blood vessel candidate region forms an identical blood vessel region, based on the evaluation values.

In some embodiments, a non-transitory computer-readable recording medium with an executable program stored thereon is presented. The program instructs an image processing apparatus for processing an image acquired by imaging a living body, to execute: a blood vessel candidate region extraction step of extracting a plurality of blood vessel candidate regions from the image; an identical blood vessel candidate region extraction step of extracting, from among the plurality of blood vessel candidate regions, a blood vessel candidate region group estimated to form a line shape when integrated, as an identical blood vessel candidate region; an evaluation value calculation step of calculating one or more kinds of evaluation values for evaluating a likelihood that the identical blood vessel candidate region corresponds to an identical blood vessel; and a blood vessel region discrimination step of discriminating whether or not the identical blood vessel candidate region forms an identical blood vessel region, based on the evaluation values.

The above and other features, advantages and technical and industrial significance of this invention will be better understood by reading the following detailed description of presently preferred embodiments of the invention, when considered in connection with the accompanying drawings.

DETAILED DESCRIPTION

An image processing apparatus, an image processing method, and an image processing program according to some embodiments of the present invention will now be described with reference to the drawings. The present invention is not to be limited by these embodiments. The same reference signs are used to designate the same elements throughout the drawings.

First Embodiment

Figure 1:
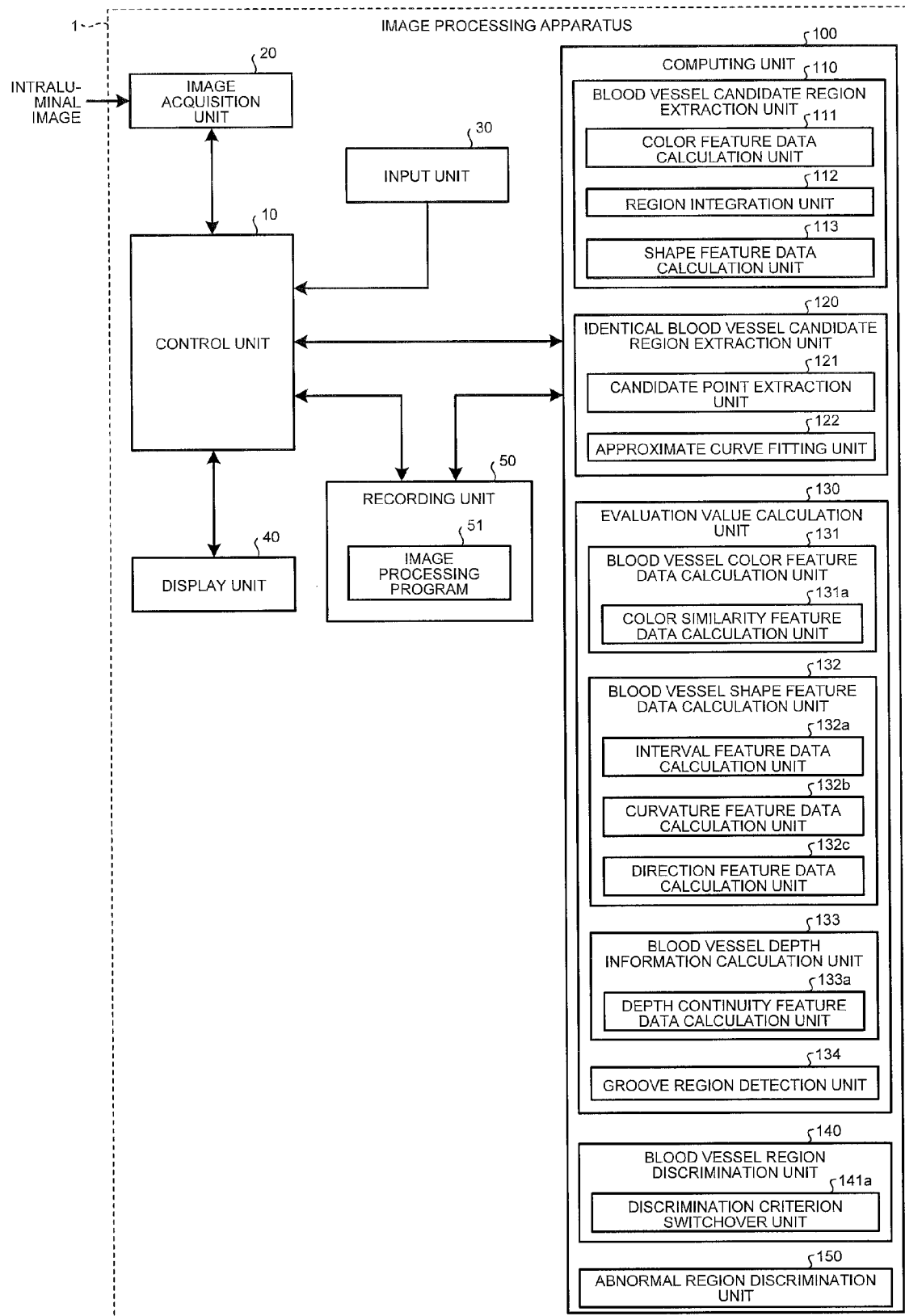
FIG. 1 is a block diagram illustrating a configuration of an image processing apparatus according to a first embodiment of the present invention.

FIG. 1 is a block diagram illustrating an image processing apparatus according to a first embodiment of the present invention. An image processing apparatus 1 according to the first embodiment is an apparatus performing image processing which detects an abnormal region such as redness and a bleeding point by discriminating an abnormality such as the redness and bleeding point from a normal visible blood vessel. Note that while an intraluminal image (hereinafter simply referred to as an image as well) acquired by capturing the interior of a lumen of a living body being a subject with use of an endoscope or a capsule endoscope is subjected to processing in the following description, an image acquired by an observation apparatus other than the endoscope or the capsule endoscope may be subjected to processing as well. The intraluminal image acquired by the endoscope or the like is usually a color image having a pixel level (pixel value) corresponding to wavelength components of R (red), G (green) and B (blue) at each pixel position.

As illustrated in FIG. 1, the image processing apparatus 1 includes a control unit 10 which controls an operation of the entire image processing apparatus 1, an image acquisition unit 20 which acquires image data corresponding to a narrow-band image captured by an endoscope, an input unit 30 which generates an input signal by an operation from the outside, a display unit 40 which performs various displays, a recording unit 50 which stores the image data acquired by the image acquisition unit 20 as well as various programs, and a computing unit 100 which executes predetermined image processing on the image data.

The control unit 10 realized by hardware such as a CPU reads various programs recorded in the recording unit 50 to give an instruction and transfer data to each unit configuring the image processing apparatus 1 according to the image data input from the image acquisition unit 20 and an operation signal input from the input unit 30, thereby having control over an operation of the entire image processing apparatus 1.

The image acquisition unit 20 is configured appropriately according to a mode of a system including the endoscope. When a portable recording medium is used to pass the image data to/from the capsule endoscope, for example, the image acquisition unit 20 detachably includes the recording medium and is formed of a reader device reading the image data of an image being recorded. When there is installed a server saving the image data of an image captured by the endoscope, the image acquisition unit 20 is formed of a communication device or the like connected to the server and acquires the image data by performing data communication with the server. Alternatively, the image acquisition unit 20 may be formed of an interface which inputs an image signal from the endoscope through a cable.

The input unit 30 is realized by an input device such as a keyboard, a mouse, a touch panel and various switches, and outputs to the control unit 10 the input signal generated according to an operation performed on these input devices from the outside.

The display unit 40 is realized by a display device such as an LCD and an EL display, and displays various screens including the intraluminal image under control of the control unit 10.

The recording unit 50 is realized by an information recording device such as various IC memories including a ROM such as a flash memory and a RAM that can be updated, a hard disk that is built in or connected by a data communication terminal, or a CD-ROM as well as a reading device of the information recording device. In addition to the image data acquired by the image acquisition unit 20, the recording unit 50 stores a program used to operate the image processing apparatus 1 and cause the image processing apparatus 1 to execute various functions as well as data used while the program is being executed. Specifically, the recording unit 50 stores an image processing program 51 or the like which causes the image processing apparatus 1 to execute image processing in which the abnormal region such as the redness and bleeding point is detected while discriminated from the normal visible blood vessel, from the intraluminal image acquired by the endoscope.

The computing unit 100 realized by hardware such as a CPU reads the image processing program 51 to execute the image processing in which the abnormal region such as the redness and bleeding point is detected while discriminated from the normal visible blood vessel, from the intraluminal image.

A configuration of the computing unit 100 will now be described. As illustrated in FIG. 1, the computing unit 100 includes a blood vessel candidate region extraction unit 110 which extracts a plurality of blood vessel candidate regions from an image, an identical blood vessel candidate region extraction unit 120 which extracts a blood vessel candidate region group (hereinafter referred to as an identical blood vessel candidate region) that appears to form the identical blood vessel region from among the plurality of blood vessel candidate regions, an evaluation value calculation unit 130 which calculates an evaluation value which evaluates a likelihood of the identical blood vessel candidate region being the identical blood vessel, a blood vessel region discrimination unit 140 which discriminates whether or not the identical blood vessel candidate region forms the identical blood vessel region based on the evaluation value, and an abnormal region discrimination unit 150 which discriminates a blood vessel candidate region not discriminated to form the identical blood vessel region as an abnormal region from among the blood vessel candidate regions extracted by the blood vessel candidate region extraction unit 110.

The blood vessel candidate region extraction unit 110 includes a color feature data calculation unit 111, a region integration unit 112 and a shape feature data calculation unit 113, and extracts a region with strong redness within the image as the blood vessel candidate region. The color feature data calculation unit 111 calculates an R/G value as color feature data of each pixel within the image. The region integration unit 112 performs region integration processing based on the R/G value. The shape feature data calculation unit 113 calculates shape feature data of a region integrated by the region integration unit 112.

The identical blood vessel candidate region extraction unit 120 includes a candidate point extraction unit 121 and an approximate curve fitting unit 122, and extracts the blood vessel candidate region group estimated to form a line shape when integrated as the identical blood vessel candidate region by repeating extraction of a candidate point from the blood vessel candidate region and fitting of an approximate curve. The candidate point extraction unit 121 extracts an arbitrary pixel, region, or blood vessel candidate region within the plurality of blood vessel candidate regions extracted by the blood vessel candidate region extraction unit 110 as a candidate pixel or candidate region (hereinafter collectively referred to as the candidate point) in robust estimation. The approximate curve fitting unit 122 fits an approximate curve in the candidate point extracted.

The evaluation value calculation unit 130 calculates one or more kinds of evaluation values evaluating the likelihood of the identical blood vessel candidate region being the identical blood vessel. Here, the likelihood of being the identical blood vessel refers to a degree that the blood vessel candidate region group included in the identical blood vessel candidate region is determined to form the identical blood vessel. In the first embodiment, the evaluation value calculation unit 130 includes a blood vessel color feature data calculation unit 131 which calculates the color feature data within the identical blood vessel candidate region, a blood vessel shape feature data calculation unit 132 which calculates feature data of the shape of the identical blood vessel candidate region (hereinafter simply referred to as shape feature data), a blood vessel depth information calculation unit 133 which calculates depth information of an image to be processed, and a groove region detection unit 134 which detects a groove region within the image, where the evaluation value calculation unit calculates six kinds of evaluation values by using each of these units. Here, the depth information refers to information corresponding to a distance between an imaging unit (such as the endoscope and capsule endoscope) and a subject (such as a mucous membrane surface of a living body) when capturing the image to be processed.

The blood vessel color feature data calculation unit 131 includes a color similarity feature data calculation unit 131a which calculates an amount representing similarity of the color feature data within the identical blood vessel candidate region as a characteristic of the color feature data within the identical blood vessel candidate region.

The blood vessel shape feature data calculation unit 132 includes an interval feature data calculation unit 132a which calculates feature data based on an interval of the blood vessel candidate region in the identical blood vessel candidate region, a curvature feature data calculation unit 132b which calculates feature data based on curvature of the line shape corresponding to the identical blood vessel candidate region, and a direction feature data calculation unit 132c which calculates feature data representing similarity between an extending direction of the identical blood vessel candidate region and a longitudinal direction of each blood vessel candidate region included in the identical blood vessel candidate region, the each feature data being calculated as the shape feature data.

The blood vessel depth information calculation unit 133 includes a depth continuity feature data calculation unit 133a which calculates feature data representing continuity of the depth information within the identical blood vessel candidate region.

The groove region detection unit 134 detects the groove region such as a fold of a mucous membrane based on gradient intensity such as luminance of each pixel within the image.

The blood vessel region discrimination unit 140 discriminates whether or not the identical blood vessel candidate region forms the identical blood vessel region based on the evaluation value calculated by the evaluation value calculation unit 130. More specifically, the blood vessel region discrimination unit 140 includes a discrimination criterion switchover unit 141a which switches over a discrimination criterion when a plurality of kinds (such as six kinds as described above) of evaluation values is calculated, and discriminates the identical blood vessel candidate region satisfying all discrimination criteria as the blood vessel region.

The abnormal region discrimination unit 150 discriminates, as the abnormal region such as the redness and bleeding point, a blood vessel candidate region that is not discriminated to be the identical blood vessel region from among the blood vessel candidate regions extracted by the blood vessel candidate region extraction unit 110.

Figure 2:
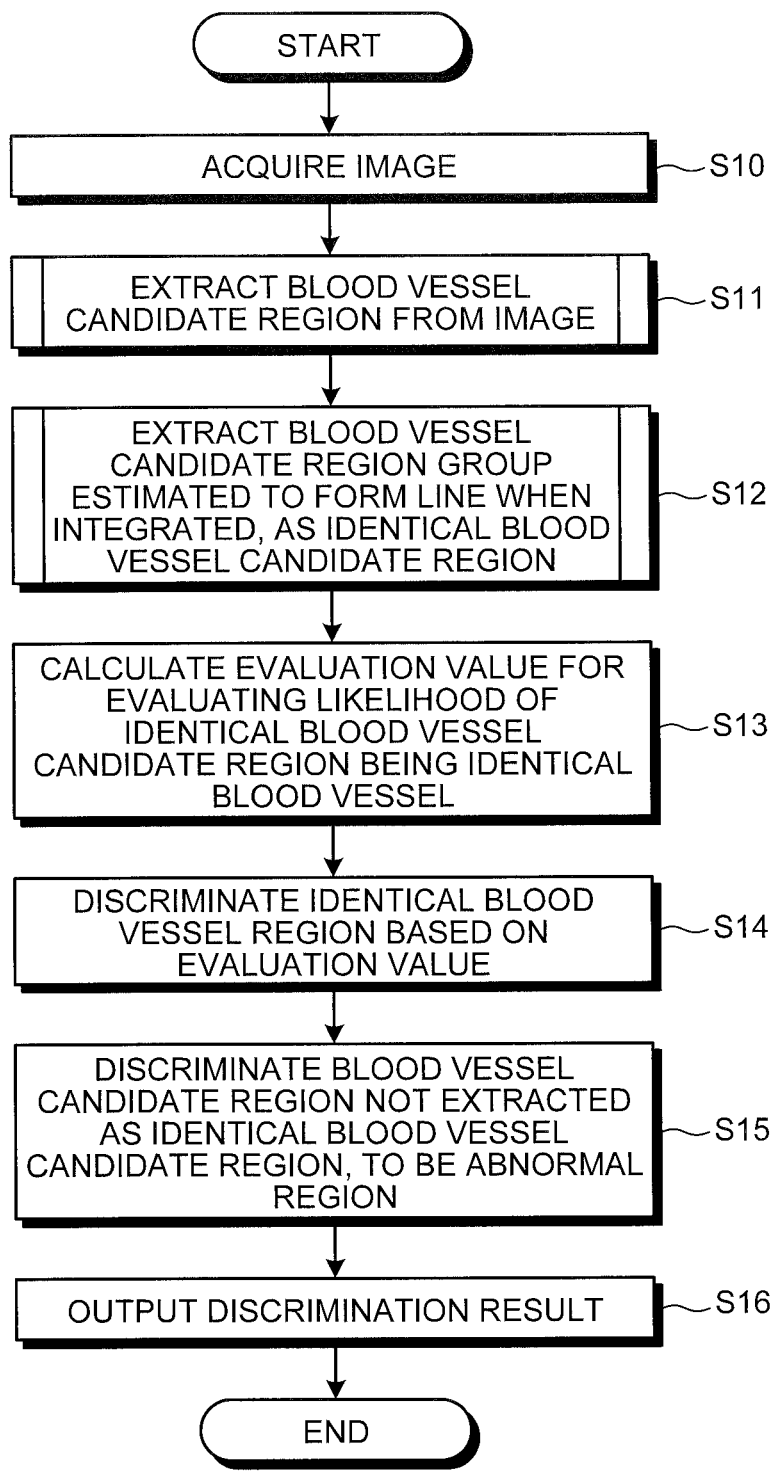
FIG. 2 is a flowchart illustrating an operation of the image processing apparatus illustrated in FIG. 1.

Next, an operation of the image processing apparatus 1 will be described. FIG. 2 is a flowchart illustrating the operation of the image processing apparatus 1. Note that the image to be processed is acquired in advance through the image acquisition unit 20 and recorded in the recording unit 50.

First, in step S10, the computing unit 100 acquires the image to be processed from the recording unit 50.

Figure 3:
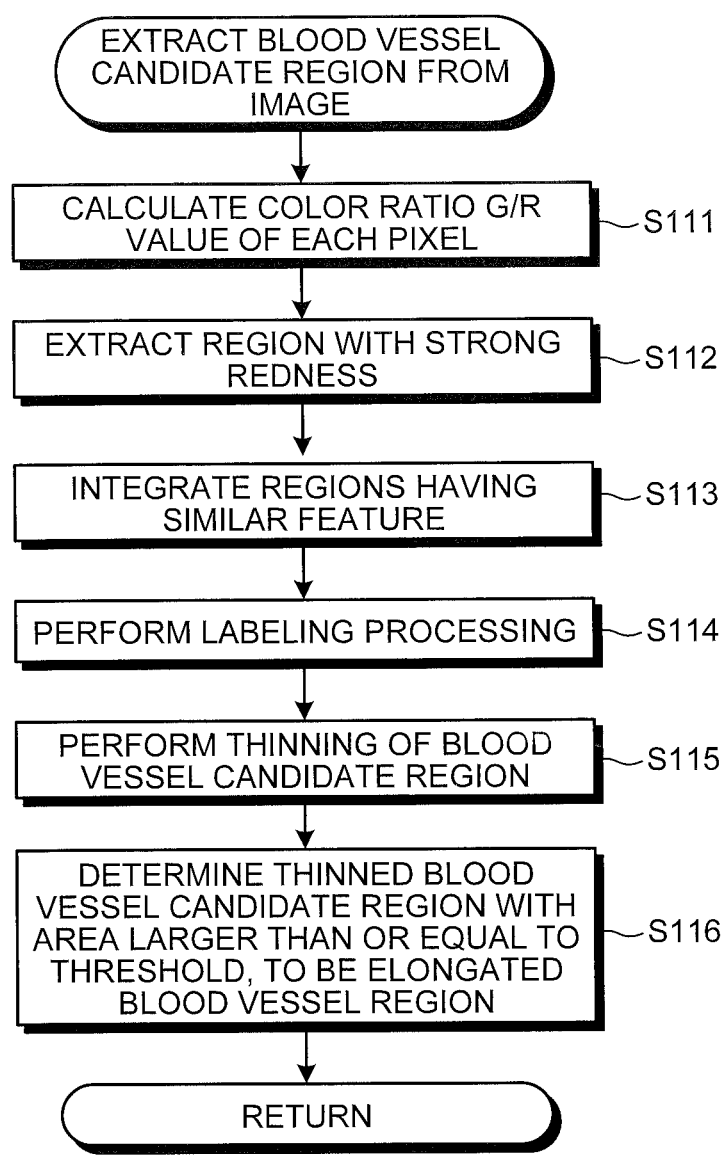
FIG. 3 is a flowchart illustrating detailed processing executed by a blood vessel candidate region extraction unit illustrated in FIG. 1.

In step S11, the blood vessel candidate region extraction unit 110 extracts the blood vessel candidate region from the image to be processed. FIG. 3 is a flowchart illustrating detailed processing executed by the blood vessel candidate region extraction unit 110.

In step S111, the color feature data calculation unit 111 calculates a color ratio G/R value of each pixel as the color feature data based on the following expression (1). In expression (1), each of $I_G$ and $I_R$ indicates a pixel value of each pixel (signal strength of each color component).

$$(G/R \text{ value}) = I_G / I_R \qquad (1)$$

Next, in step S112, the blood vessel candidate region extraction unit 110 extracts a region with the G/R value smaller than or equal to a predetermined threshold, namely a region with strong redness, as the blood vessel candidate region.

In step S113, the region integration unit 112 performs region integration which integrates regions with a color feature similar to that of the extracted blood vessel candidate region (Reference: CG-ARTS Society, "Digital Image Processing", page 196). Pixels with the G/R value that falls within a predetermined range in the blood vessel candidate region are integrated together, for example. Accordingly, the shape of the blood vessel candidate region that is difficult to be discriminated by just performing threshold processing on the color feature data (step S111) is now discriminated more easily (refer to steps S115 and S116 to be described). Note that a method other than the region integration may be employed when the regions with the feature similar to that of the extracted blood vessel candidate region can be integrated together.

Next, in step S114, the shape feature data calculation unit 113 performs labeling processing (Reference: CG-ARTS Society, "Digital Image Processing", pages 181-182) on the region integrated in step S113. The region to which the identical label is assigned is treated as one blood vessel candidate region.

In step S115, the shape feature data calculation unit 113 performs line thinning (Reference: CG-ARTS Society, "Digital Image Processing", pages 187-188) on the blood vessel candidate region.

Next, in step S116, the shape feature data calculation unit 113 calculates an area (pixel count) of the thinned blood vessel candidate region and determines a blood vessel candidate region having the area larger than or equal to a threshold (having an elongate shape feature with the length longer than or equal to a predetermined value) to be an elongated blood vessel region. The elongated blood vessel region is output as a normal blood vessel (to be described) and at the same time continues to be used as one blood vessel candidate region in step S12 and on in order to evaluate continuity of another blood vessel candidate region. After that, the operation of the image processing apparatus 1 goes back to a main routine.

Figure 4:
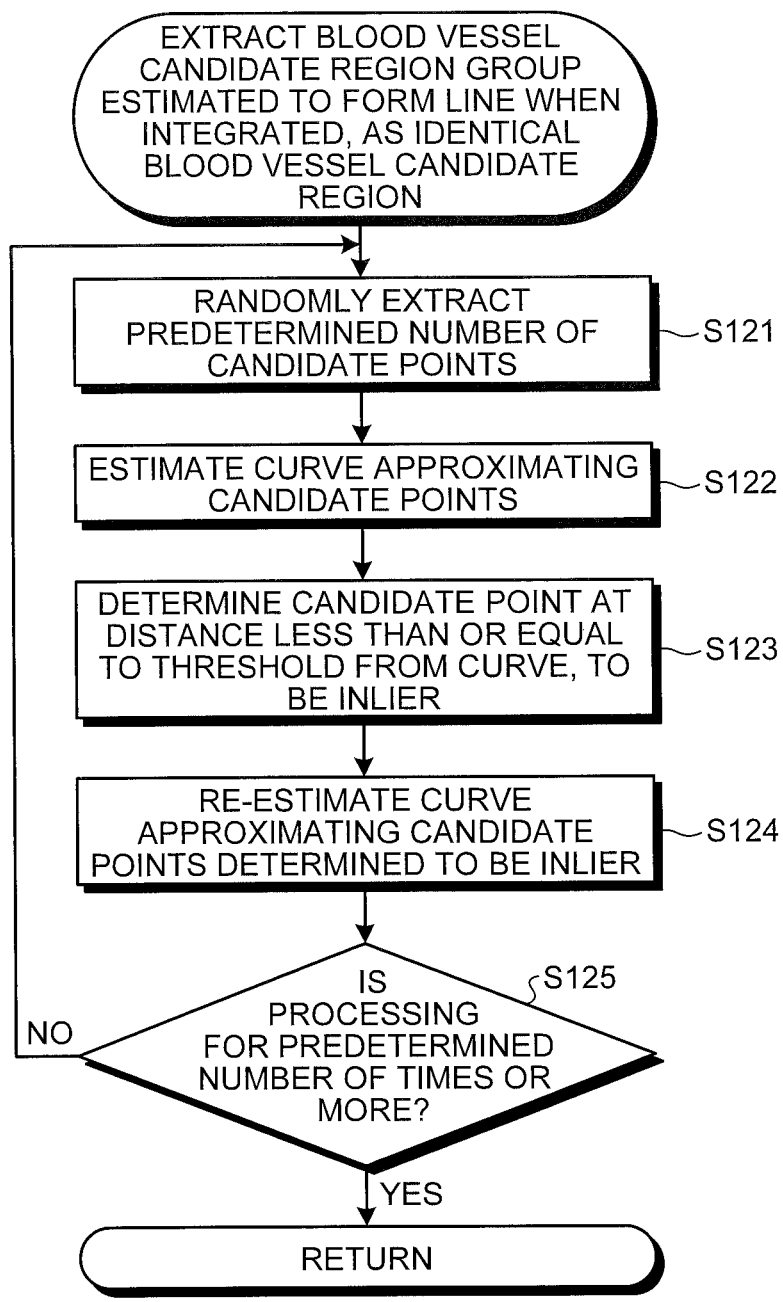
FIG. 4 is a flowchart illustrating details of processing executed by an identical blood vessel candidate region extraction unit illustrated in FIG. 1.
Figure 5:
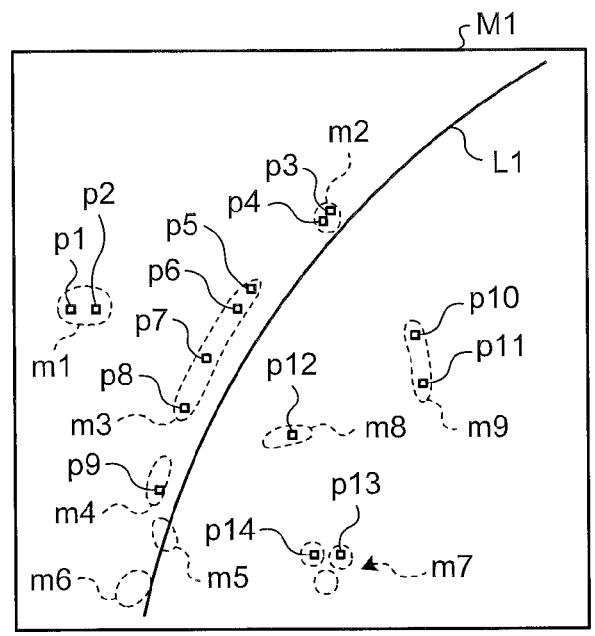
FIG. 5 is a schematic view illustrating the processing executed by the identical blood vessel candidate region extraction unit illustrated in FIG. 1.
Figure 6:
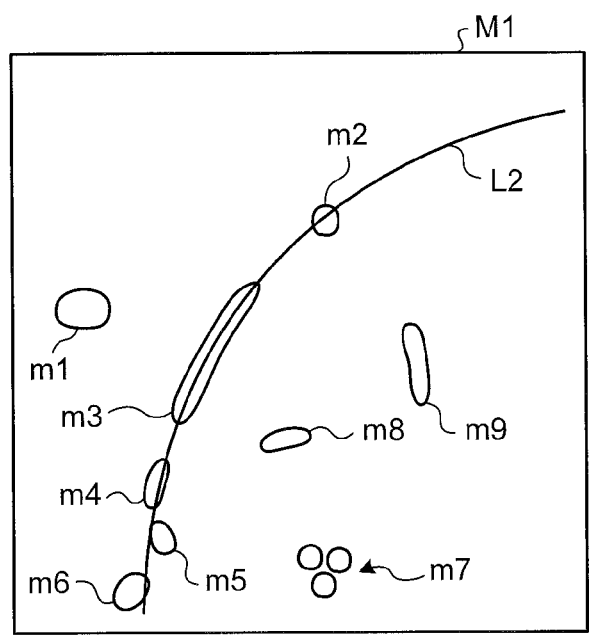
FIG. 6 is a schematic view illustrating the processing executed by the identical blood vessel candidate region extraction unit illustrated in FIG. 1.

In step S12 following step S11, the identical blood vessel candidate region extraction unit 120 extracts, from among the blood vessel candidate regions extracted in step S11, the blood vessel candidate region group estimated to form a line shape when integrated as the identical blood vessel candidate region. FIG. 4 is a flowchart illustrating details of the processing executed by the identical blood vessel candidate region extraction unit 120. FIGS. 5 and 6 are schematic views illustrating the processing executed by the identical blood vessel candidate region extraction unit 120.

In step S121, the candidate point extraction unit 121 randomly extracts, as candidate points, a predetermined number of pixels or regions within the blood vessel candidate region or the blood vessel candidate region itself. When the region within the blood vessel candidate region or the blood vessel candidate region itself is extracted as the candidate point, a representative point (such as centroid) within the region or each pixel within the region may be determined as the candidate point.

Moreover, the number of candidate points extracted may correspond to a preset fixed value or may be determined according to the number of the blood vessel candidate regions extracted in step S11. In the latter case, it may be adapted to increase the number of candidate points as a larger number of the blood vessel candidate regions are extracted. When blood vessel candidate regions m1 to m9 are extracted from an image M1 as illustrated in FIG. 5 (refer to step S11), for example, pixels p1 to p14 are extracted as the candidate points from these blood vessel candidate regions.

Next, in step S122, the approximate curve fitting unit 122 estimates a curve approximating the candidate points extracted in step S121 by a least mean square method, for example. A curve L1 is estimated for the pixels p1 to p9 in the case illustrated in FIG. 5, for example.

In step S123, the approximate curve fitting unit 122 determines the candidate point which is at a distance less than or equal to a threshold from the estimated curve, to be an inlier (hit value). Each of the remaining candidate points is determined to be an outlier (outlier value). The pixels p3 to p9 are determined as inliers for the curve L1 in the case illustrated in FIG. 5, for example.

Next, in step S124, the approximate curve fitting unit 122 re-estimates a curve approximating the candidate points determined to be the inliers by the least mean square method, for example. A blood vessel candidate region group which is located within a predetermined range of distance from the re-estimated curve is extracted as the identical blood vessel candidate region. A curve L2 illustrated in FIG. 6 is estimated for the pixels p3 to p9 illustrated in FIG. 5, for example. In this case, the blood vessel candidate regions m2 to m6 located within a predetermined range of distance from the curve L2 are extracted as the identical blood vessel candidate regions.

Next, in step S125, the identical blood vessel candidate region extraction unit 120 determines whether or not the processing in each of steps S121 to S124 is repeated for a predetermined number of times or more. When the processing is repeated for the predetermined number of times or more (step S125: Yes), the operation of the image processing apparatus 1 goes back to the main routine. On the other hand, the processing returns to step S121 when the processing is not yet repeated for the predetermined number of times or more (step S125: No).

In step S13 following step S12, the evaluation value calculation unit 130 calculates the evaluation value for evaluating the likelihood that the identical blood vessel candidate region extracted in step S12 is the identical blood vessel. Evaluation values 1 to 6 described below are calculated as the evaluation values for each of the identical blood vessel candidate regions.

Evaluation Value 1: Variance of Color Feature Data

The color similarity feature data calculation unit 131a extracts the blood vessel candidate region included in the identical blood vessel candidate region, namely the blood vessel candidate region which is at the predetermined distance from the curve estimated in step S12. As described above, the blood vessel candidate regions m2 to m6 are extracted for the curve L2 in the case illustrated in FIG. 6, for example.

The color similarity feature data calculation unit 131a then calculates variance of the G/R value of the pixel included in the extracted blood vessel candidate region. The variance represents the similarity of the color feature data and is used as the evaluation value 1. In this case, variation of the color feature data is smaller as the variance is smaller, meaning that the similarity of the color feature data within the identical blood vessel candidate region is high and that the identical blood vessel candidate region is evaluated as being the identical blood vessel.

As a variation of the evaluation value 1, it may be adapted to calculate a mean and variance of a G/R value of the pixel included in the blood vessel candidate region that is at a predetermined distance from the curve, find the maximum value of a Mahalanobis distance by calculating a G/R value of each blood vessel candidate region that is at the predetermined distance from the curve, and use the maximum value of the Mahalanobis distance and the variance as the evaluation value (amount representing the similarity of the color feature data). In this case, color variation of the blood vessel candidate region in the identical blood vessel candidate region is smaller (the similarity is higher) as the variance and the maximum value of the Mahalanobis distance are smaller, whereby the identical blood vessel candidate region is evaluated as being the identical blood vessel.

Evaluation Value 2: Mean of Smallest Distances Between Centroids

Figure 7:
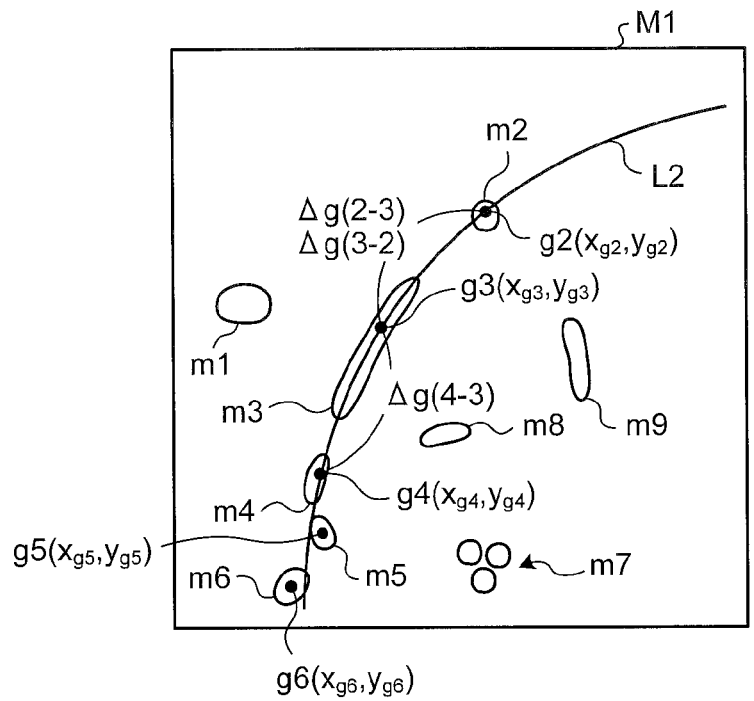
FIG. 7 is a schematic view illustrating a method of calculating an evaluation value which evaluates a likelihood of being the identical blood vessel.

For each identical blood vessel candidate region, the interval feature data calculation unit 132a extracts the blood vessel candidate region included in the identical blood vessel candidate region, namely the blood vessel candidate region which is at the predetermined distance from the curve estimated in step S12. The interval feature data calculation unit 132a then calculates centroid coordinates in an image space of the blood vessel candidate region extracted. When the blood vessel candidate regions m2 to m6 are extracted for the curve L2 as illustrated in FIG. 7, for example, coordinates $(x_{g2}, y_{g2})$ to $(x_{g6}, y_{g6})$ of centroids g2 to g6 are calculated from the blood vessel candidate regions m2 to m6, respectively. The interval feature data calculation unit 132a further calculates the smallest distance between the centroid coordinates for each blood vessel candidate region. Concerning the centroid g2, for example, the distance between the centroid g2 and the centroid g3 is shorter than the distance between the centroid g2 and the centroid g4, whereby a distance Δg (2–3) with the centroid g3 is calculated. Concerning the centroid g3, the distance between the centroid g3 and the centroid g2 is shorter than the distance between the centroid g3 and the centroid g4, whereby a distance Δg (3–2) with the centroid g2 is calculated. Concerning the centroid g4, the distance between the centroid g4 and the centroid g3 is shorter than the distance between the centroid g4 and the centroid g2, whereby a distance Δg (4–3) with the centroid g3 is calculated. The same can be said for the other centroids g4 to g6. The mean of these smallest distances is used as the evaluation value 2. In this case, continuity of the blood vessel candidate region is higher as the mean of the smallest distances is smaller, whereby the identical blood vessel candidate region is evaluated as being the identical blood vessel.

Evaluation Value 3: Mean of Curvatures of Curve

Figure 8:
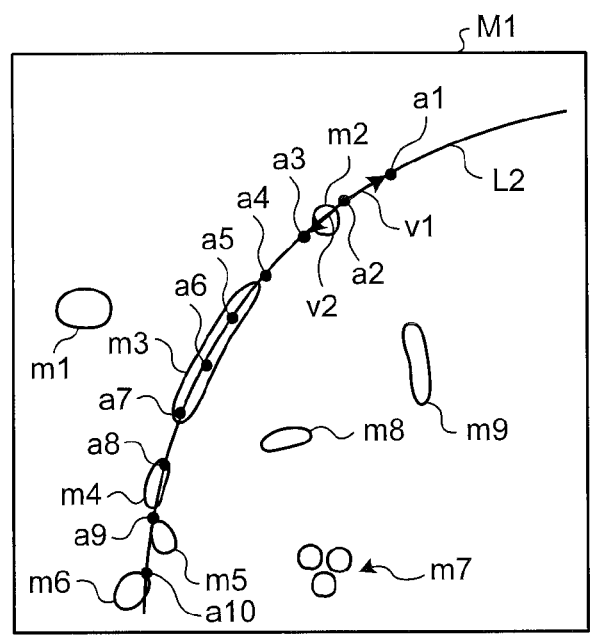
FIG. 8 is a schematic view illustrating a method of calculating the evaluation value which evaluates the likelihood of being the identical blood vessel.

The curvature feature data calculation unit 132b extracts a plurality of points at equal intervals on the curve estimated in step S12. A plurality of points a1 to a10 is extracted for the curve L2 as illustrated in FIG. 8, for example. The curvature feature data calculation unit 132b then calculates, as a curvature, a vector inner product for two points adjacent on both sides on the curve for all the points extracted. Concerning the point a2, for example, an inner product of a vector v1 directed toward the point a1 and a vector v2 directed toward the point a3 is calculated. The curvature feature data calculation unit 132b further calculates a mean of the vector inner product calculated for each point. In the case illustrated in FIG. 8, for example, the mean of vector inner products calculated for the points a2 to a9 excluding the points a1 and a10 located on both sides is calculated. The mean of these vector inner products (curvatures) is used as the evaluation value 3. In this case, the estimated curve is smoother as the mean of the curvatures is larger, whereby the identical blood vessel candidate region is evaluated as being the identical blood vessel.

Figure 9:
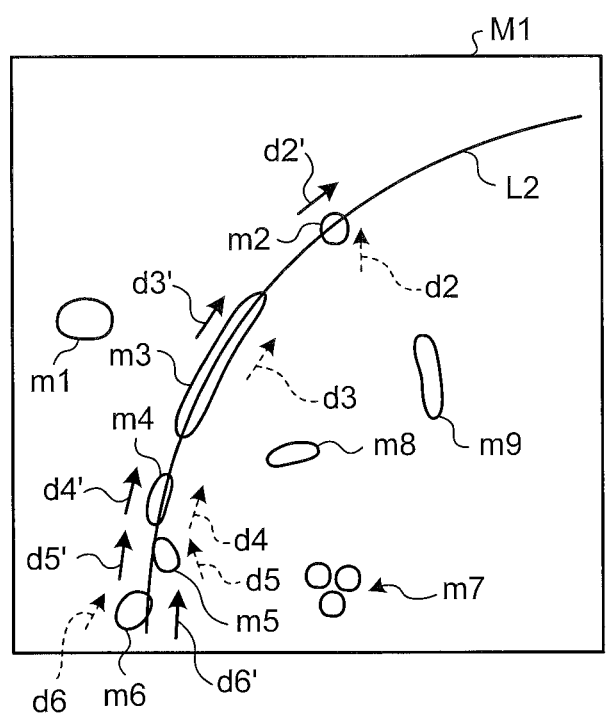
FIG. 9 is a schematic view illustrating a method of calculating the evaluation value which evaluates the likelihood of being the identical blood vessel.

Evaluation Value 4: Similarity Between Extending Direction of Identical Blood Vessel Candidate Region and Longitudinal Direction of Blood Vessel Candidate Region For each identical blood vessel candidate region, the direction feature data calculation unit 132c extracts the blood vessel candidate region included in the identical blood vessel candidate region, namely the blood vessel candidate region which is at the predetermined distance from the curve estimated in step S12. The direction feature data calculation unit 132c then calculates a longitudinal direction of each blood vessel candidate region extracted. When the blood vessel candidate regions m2 to m6 are extracted for the curve L2 as illustrated in FIG. 9, for example, longitudinal directions d2 to d6 of the blood vessel candidate regions m2 to m6 are calculated, respectively. On the other hand, the direction feature data calculation unit 132c calculates, as an extending direction of the identical blood vessel candidate region, a direction tangent to the curve at a position (such as a centroid position) of each blood vessel candidate region. In the case illustrated in FIG. 9, for example, directions d2' to d6' tangent to the curve L2 at the position (such as the centroid position) of the blood vessel candidate regions m2 to m6 are calculated, respectively. The direction feature data calculation unit 132c further calculates for each blood vessel candidate region a difference between the direction tangent to the curve and the longitudinal direction of the blood vessel candidate region. Specifically, an angle formed between the tangent direction and the longitudinal direction or an inner product of the two is calculated as the difference. A mean or total value of the difference is used as the evaluation value 4. In this case, the extending direction of the identical blood vessel candidate region better corresponds with (is more similar to) the longitudinal direction of the blood vessel candidate region as the difference between the direction tangent to the curve and the longitudinal direction of the blood vessel candidate region is smaller, whereby it is evaluated that the curve is properly estimated along the blood vessel candidate region.

Evaluation Value 5: Continuity of Depth Information

The depth continuity feature data calculation unit 133a acquires depth information within the image to be processed. The first embodiment is adapted to acquire as the depth information a pixel value (R value) corresponding to an R component which is a wavelength component not easily absorbed or scattered within a living body. In this case, a subject is located at a position closer in the depth direction as the R value has a larger value. In addition to the R value, a value (such as luminance) correlated with the distance in the depth direction of the image may be used as the depth information.

The depth continuity feature data calculation unit 133a then extracts a plurality of points at equal intervals on the curve estimated in step S12. Then, an amount of change in the R value between two points adjacent on both sides is calculated for all the points extracted. When the points a1 to a9 are extracted for the curve L2 as illustrated in FIG. 8, for example, an amount of change in the R value between each of the points a1 and a2, the points a2 and a3, up to the points a8 and a9 is calculated. The depth continuity feature data calculation unit 133a further extracts the maximum value of the calculated amount of change in the R value. The maximum value is used as the evaluation value 5 (feature data representing continuity of the depth information). In this case, one can say the depth information changes more continuously as the maximum value is smaller, whereby the identical blood vessel candidate region is evaluated as being the identical blood vessel.

Evaluation Value 6: Pixel Count of Groove Region in Identical Blood Vessel Candidate Region The groove region detection unit 134 calculates the gradient intensity of a pixel value in the image to be processed by using a Laplacian filter or a Sobel filter, for example (Reference: CG-ARTS Society, "Digital Image Processing", pages 114 to 121). Note that the luminance may be used as the pixel value in addition to the R value and a G value of each pixel.

Next, the groove region detection unit 134 detects a pixel with the gradient intensity higher than or equal to a predetermined value as a groove region. The pixel count in the groove region on the curve estimated in step S12 is then calculated and used as the evaluation value 6. In this case, one can say there is fewer groove regions on the curve as the pixel count is smaller, whereby the identical blood vessel candidate region is evaluated as being the identical blood vessel.

In step S14 following step S13, the blood vessel region discrimination unit 140 discriminates the identical blood vessel region based on the evaluation value calculated in step S13. Specifically, the identical blood vessel candidate region is discriminated to be the identical blood vessel region when all the evaluation values 1 to 6 satisfy their criteria set in advance.

In step S15, the abnormal region discrimination unit 150 discriminates a blood vessel candidate region, which is not extracted as the identical blood vessel region in step S14 among the blood vessel candidate regions extracted in step S11, to be a dotted abnormal region (such as redness or a bleeding point).

In step S16, the computing unit 100 outputs and records in the recording unit 50 the dotted abnormal region discriminated in step S15. At the same time, the computing unit 100 outputs the long and thin blood vessel region extracted in step S116 and the identical blood vessel region discriminated in step S14 as normal blood vessels. The image processing apparatus 1 thereafter ends its operation.

As described above, the first embodiment is adapted to extract the blood vessel candidate regions based on the color feature data of each pixel within the image, extract the blood vessel candidate region group estimated to form a line shape when integrated as the identical blood vessel candidate region, and discriminate whether or not the identical blood vessel candidate region forms the identical blood vessel region based on the evaluation values calculated from the features such as color and shape of the identical blood vessel candidate region, whereby a normal visible blood vessel can be accurately extracted from the image. Moreover, the first embodiment is adapted to discriminate the blood vessel candidate region not extracted as the identical blood vessel region to be the abnormal region, so that the normal visible blood vessel can be accurately discriminated from the abnormal region such as the redness and bleeding point.

Second Embodiment

A second embodiment of the present invention will now be described.

Figure 10:
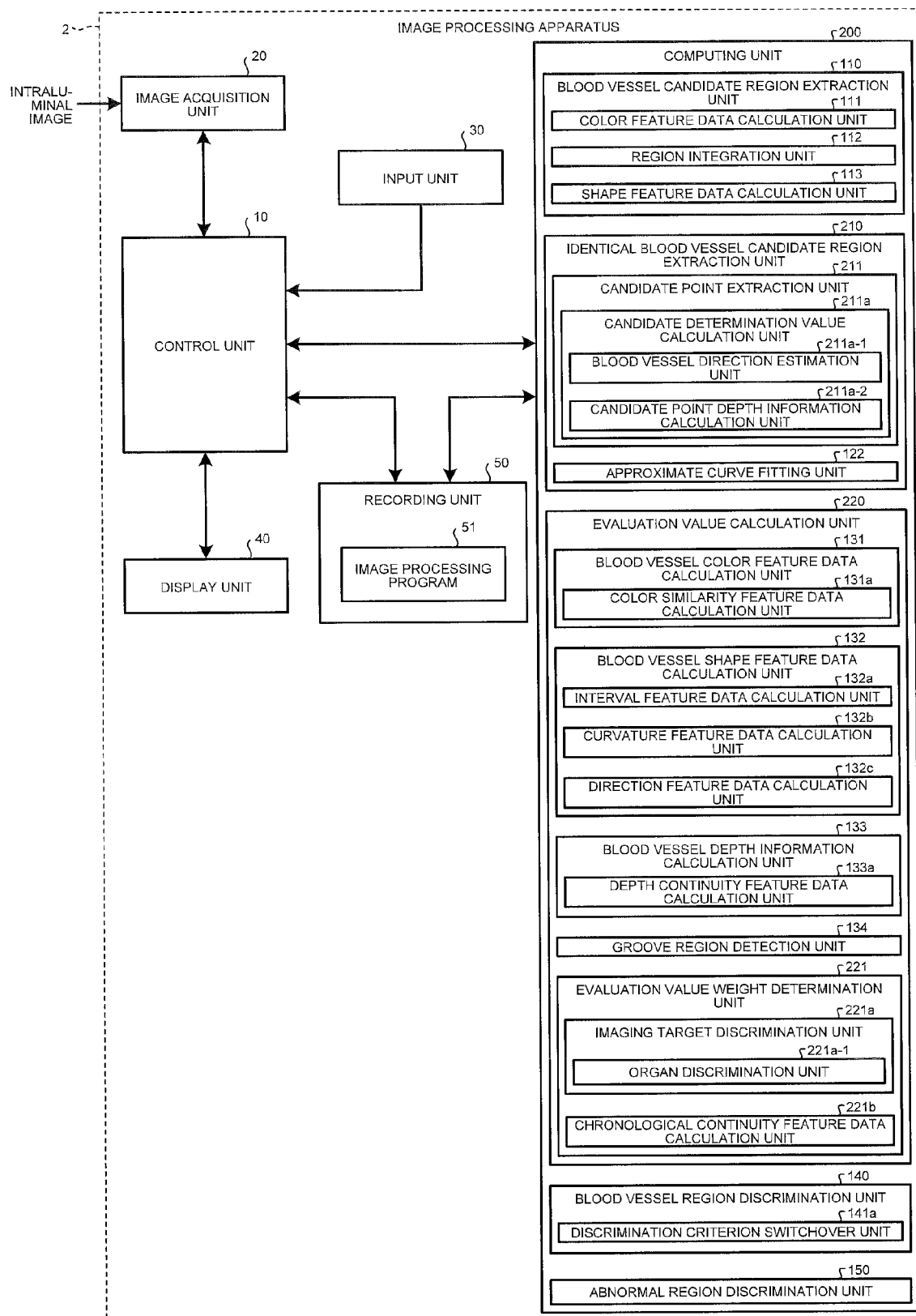
FIG. 10 is a block diagram illustrating a configuration of an image processing apparatus according to a second embodiment of the present invention.

FIG. 10 is a block diagram illustrating a configuration of an image processing apparatus according to the second embodiment of the present invention. As illustrated in FIG. 10, an image processing apparatus 2 of the second embodiment includes a computing unit 200 instead of the computing unit 100 illustrated in FIG. 1. The computing unit 200 performs image processing, in chronological order, on a series of images captured by an endoscope or capsule endoscope and acquired through an image acquisition unit 20.

The computing unit 200 includes a blood vessel candidate region extraction unit 110, an identical blood vessel candidate region extraction unit 210, an evaluation value calculation unit 220, a blood vessel region discrimination unit 140, and an abnormal region discrimination unit 150. The configuration and operation of the blood vessel candidate region extraction unit 110, the blood vessel region discrimination unit 140 and the abnormal region discrimination unit 150 are similar to those of the first embodiment.

The identical blood vessel candidate region extraction unit 210 includes a candidate point extraction unit 211 and an approximate curve fitting unit 122 illustrated in FIG. 1. The candidate point extraction unit 211 includes a candidate determination value calculation unit 211a which calculates a candidate determination value used to determine a likelihood that a pixel within a blood vessel candidate region or the blood vessel candidate region itself is a blood vessel when extracting a candidate point by robust estimation from a plurality of blood vessel candidate regions extracted by the blood vessel candidate region extraction unit 110. In the second embodiment, the candidate determination value calculation unit 211a includes a blood vessel direction estimation unit 211a-1 which estimates a direction in which a blood vessel extends and a candidate point depth information calculation unit 211a-2 which calculates distance information (depth information) in a depth direction of the blood vessel candidate region in an image to be processed, where the depth information is used as the candidate determination value.

Note that an operation of the approximate curve fitting unit 122 is similar to that of the first embodiment.

The evaluation value calculation unit 220 includes an evaluation value weight determination unit 221 in addition to a blood vessel color feature data calculation unit 131, a blood vessel shape feature data calculation unit 132, a blood vessel depth information calculation unit 133, and a groove region detection unit 134 illustrated in FIG. 1. The evaluation value weight determination unit 221 determines a weighting parameter for a plurality of kinds of evaluation values 1 to 6 calculated by the blood vessel color feature data calculation unit 131, the blood vessel shape feature data calculation unit 132, the blood vessel depth information calculation unit 133, and the groove region detection unit 134.

More specifically, the evaluation value weight determination unit 221 includes an imaging target discrimination unit 221a and a chronological continuity feature data calculation unit 221b. The imaging target discrimination unit 221a discriminates an imaging target within an image. Specifically, the imaging target discrimination unit 221a includes an organ discrimination unit 221a-1 which discriminates a type of organ captured in the image. On the other hand, the chronological continuity feature data calculation unit 221b calculates feature data representing continuity of an extracted result of a blood vessel region between images that are chronologically adjacent to each other.

The configuration and operation of each unit excluding the evaluation value weight determination unit 221 in the evaluation value calculation unit 220 are similar to those of the first embodiment.

Figure 11:
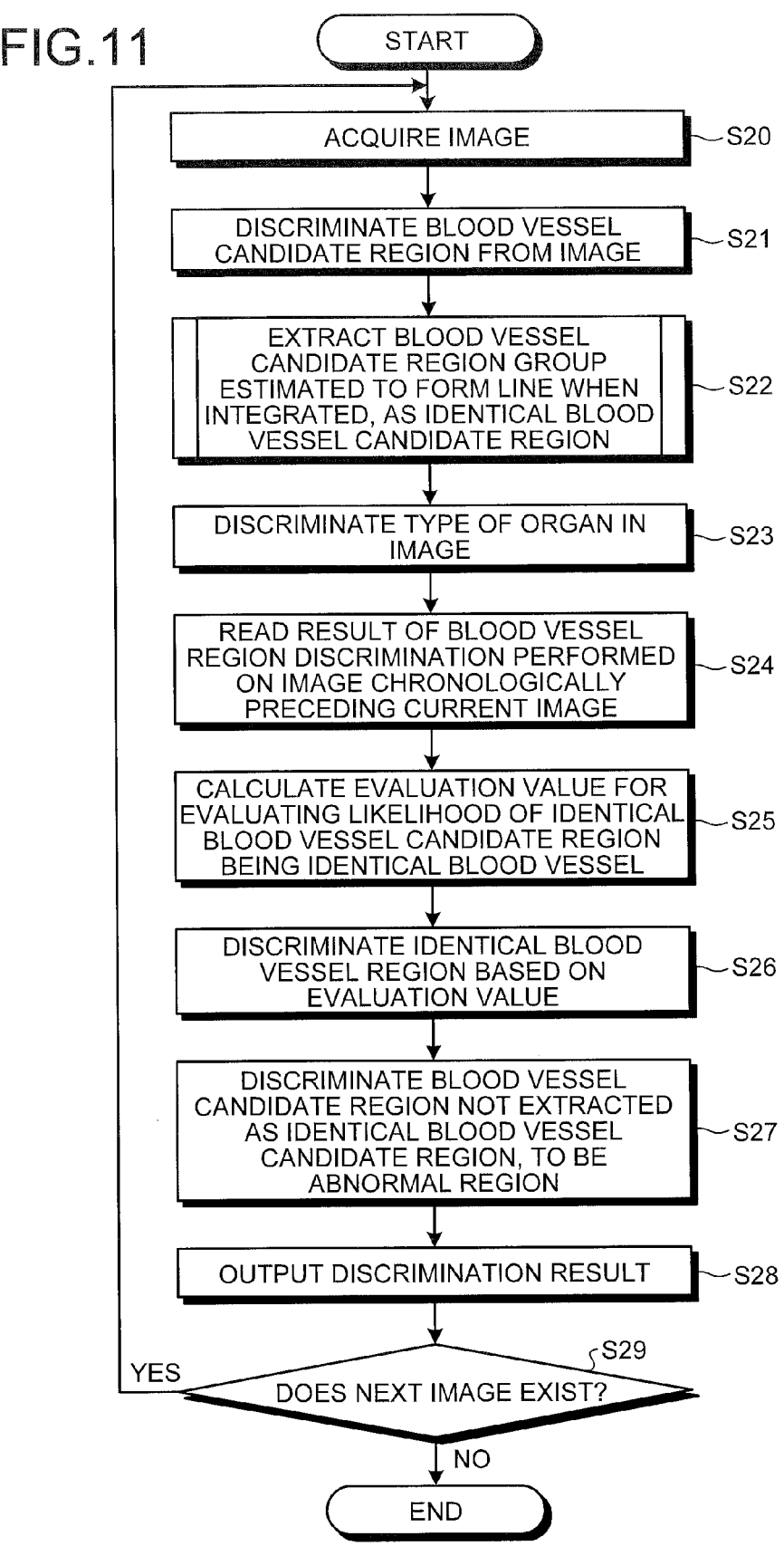
FIG. 11 is a flowchart illustrating an operation of the image processing apparatus illustrated in FIG. 10.

Next, an operation of the image processing apparatus 2 will be described. FIG. 11 is a flowchart illustrating the operation of the image processing apparatus 2. A recording unit 50 records in advance the series of images captured by the endoscope or capsule endoscope and acquired through the image acquisition unit 20.

First, in step S20, the computing unit 200 chronologically acquires an image to be processed from the series of images recorded in the recording unit 50.

In step S21, the blood vessel candidate region extraction unit 110 extracts the blood vessel candidate region from the image to be processed. Details of the processing that extracts the blood vessel candidate region are similar to that of the first embodiment (refer to step S11 in FIG. 2).

Figure 12:
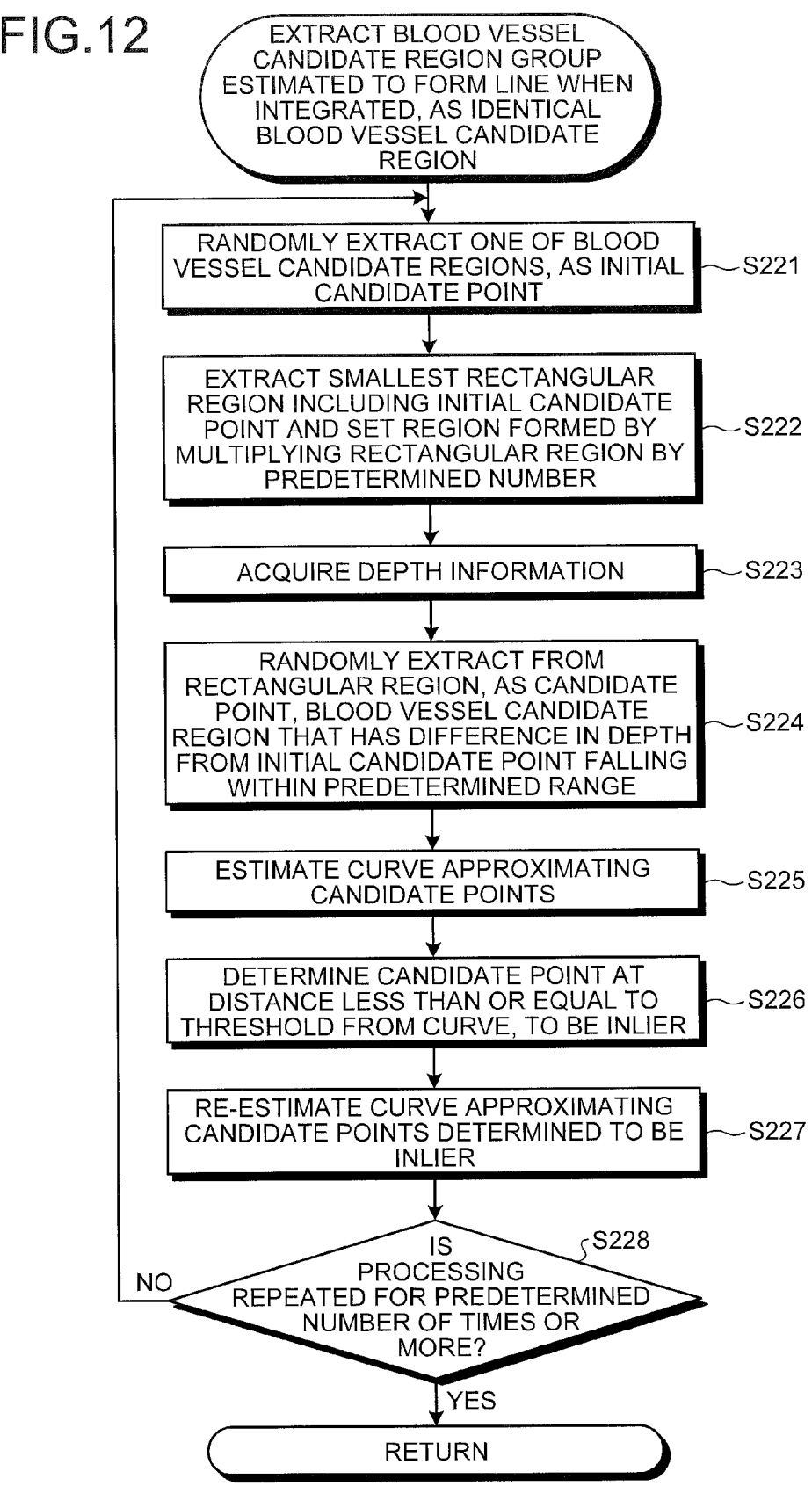
FIG. 12 is a flowchart illustrating details of processing executed by an identical blood vessel candidate region extraction unit illustrated in FIG. 10.
Figure 13:
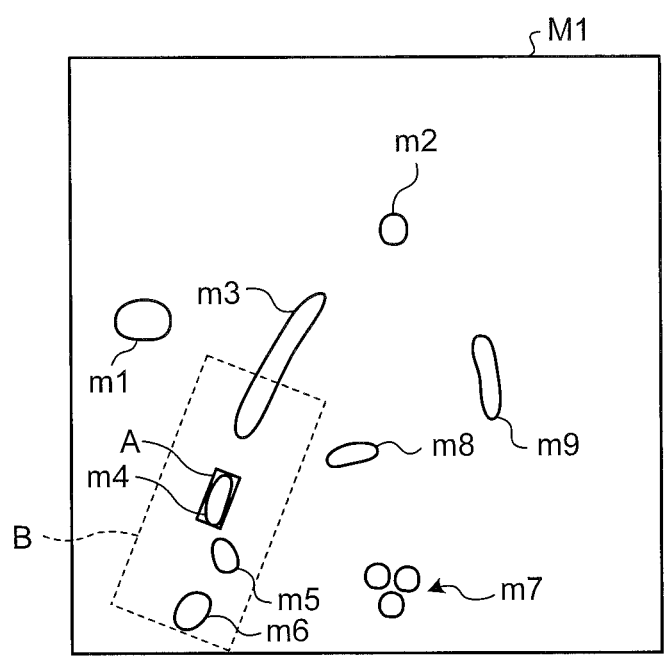
FIG. 13 is a schematic view illustrating the processing executed by the identical blood vessel candidate region extraction unit illustrated in FIG. 10.

Next, in step S22, the identical blood vessel candidate region extraction unit 210 extracts, from among the blood vessel candidate regions extracted in step S21, a blood vessel candidate region group estimated to form a line shape when integrated, as the identical blood vessel candidate region. FIG. 12 is a flowchart illustrating the details of the processing executed by the identical blood vessel candidate region extraction unit 210. FIG. 13 is a schematic view illustrating the processing executed by the identical blood vessel candidate region extraction unit 210.

First, in step S221, the candidate point extraction unit 211 randomly extracts one of the blood vessel candidate regions as an initial candidate point.

In step S222, the blood vessel direction estimation unit 211a-1 extracts a smallest rectangular region including the initial candidate point and then sets a region formed by multiplying the rectangular region by a predetermined number. The region being set is roughly a region in which a blood vessel is estimated to extend with a high possibility. Here, the multiplication factor of the rectangular region may vary for each direction. When a blood vessel candidate region m4 is extracted as the initial candidate point as illustrated in FIG. 13, for example, a smallest rectangular region A including the blood vessel candidate region m4 is extracted, and at the same time a rectangular region B formed by enlarging the rectangular region A by five-fold in each of a longitudinal direction and a lateral direction is set, for example.

In step S223, the candidate point depth information calculation unit 211a-2 acquires the depth information within the image. The second embodiment is adapted to acquire as the depth information a pixel value (R value) corresponding to an R component which is a wavelength component not easily absorbed or scattered within a living body. In this case, a subject is located at a position closer in the depth direction as the R value has a larger value. In addition to the R value, a value (such as luminance) correlated with the distance in the depth direction of the image may be used as the depth information.

In step S224, the candidate point extraction unit 211 calculates as the candidate determination value a difference between the depth information of the blood vessel candidate region located within the rectangular region set in step S222 and depth information of the initial candidate point, and randomly extracts a blood vessel candidate region with the difference falling within a predetermined range as the candidate point. In the case illustrated in FIG. 13, for example, blood vessel candidate regions m5 and m6 can be extracted as the candidate points when a difference in the R value between the blood vessel candidate region m4 being the initial candidate point and each of the blood vessel candidate regions m5 and m6 within the rectangular region B falls within the predetermined range.

Next, in step S225, the approximate curve fitting unit 122 estimates a curve approximating the candidate points by the least mean square method or the like.

In step S226, the approximate curve fitting unit 122 determines the candidate point which is at a distance less than or equal to a threshold from the estimated curve to be an inlier and the rest as an outlier.

Next, in step S227, the approximate curve fitting unit 122 re-estimates a curve approximating the candidate point determined to be the inlier by the least mean square method, for example. A blood vessel candidate region group which is located within a predetermined range of distance from the re-estimated curve is extracted as the identical blood vessel candidate region.

In step S228, the identical blood vessel candidate region extraction unit 210 determines whether or not the processing in each of steps S221 to S227 is repeated for a predetermined number of times or more. When the processing is repeated for the predetermined number of times or more (step S228: Yes), the operation of the image processing apparatus 2 goes back to the main routine. On the other hand, the processing returns to step S221 when the processing is not yet repeated for the predetermined number of times or more (step S228: No).

In step S23 following step S22, the organ discrimination unit 221a-1 discriminates the type of an organ in the image. Various known methods can be employed as a method of discriminating the organ. As an example, there will be described a method of discriminating the type of organ based on an average pixel value within the image (Reference: Japanese Patent Application Laid-open No. 2006-288612). First, a numerical value range of each color component (R value, G value, and B value) forming an average color of each organ including an esophagus, a stomach, a small intestine and a large intestine is determined in advance. Moreover, an average value of each color component of a pixel value (average R value, average G value, and average B value) is calculated for the image to be processed. It is then discriminated whether each of these average values calculated is included in the numerical value range of the color component of any of the organs acquired in advance. An observed region in the image to be processed is discriminated to be the esophagus when the calculated average value is included in the numerical value range of the color component forming the average color of the esophagus, for example. An observed region in the image to be processed is discriminated to be the stomach when the calculated average value is included in the numerical value range of the color component forming the average color of the stomach. An observed region in the image to be processed is discriminated to be the small intestine when the calculated average value is included in the numerical value range of the color component forming the average color of the small intestine. An observed region in the image to be processed is discriminated to be the large intestine when the calculated average value is included in the numerical value range of the color component forming the average color of the large intestine.

Next, in step S24, the chronological continuity feature data calculation unit 221b reads from the recording unit 50 a result of blood vessel region discrimination that is performed on an image chronologically preceding the current image. Note that a result of the blood vessel region discrimination performed on each of the series of images is recorded one by one in the recording unit 50 as described later.

In step S25, the evaluation value calculation unit 220 calculates the evaluation value for evaluating the likelihood that the identical blood vessel candidate region extracted in step S22 is the identical blood vessel. More specifically, the evaluation value calculation unit 220 calculates the evaluation values 1 to 6 in the manner similar to that of the first embodiment (refer to step S13 in FIG. 2) and thereafter performs weighting on the evaluation values 1 to 6 according to the organ type and the result of the blood vessel region discrimination performed on the image chronologically preceding a current image.

Specifically, the evaluation values are weighted to facilitate extraction of the blood vessel region when an organ captured in the image to be processed is not an organ to be observed or when an organ captured in the image to be processed is the large intestine in which a visible blood vessel is easily observed. In the case of the large intestine, for example, the weighting is performed to raise the evaluation values as a whole in order for the identical blood vessel candidate region to be easily extracted as the identical blood vessel. When a blood vessel region extracted in the image chronologically preceding the current image is located near the identical blood vessel candidate region extracted in the current image to be processed (such as when the displacement of the identical blood vessel candidate region for the blood vessel region in the preceding image falls within a predetermined range), the continuity of the two as well as reliability of the evaluation values are considered high so that the weight is determined to raise the evaluation values as a whole in order for the blood vessel region to be extracted easily, for example.

In step S26, the blood vessel region discrimination unit 140 discriminates the identical blood vessel region based on the evaluation values calculated and weighted in step S25. Specifically, the identical blood vessel candidate region is discriminated to be the identical blood vessel region when all the weighted evaluation values 1 to 6 satisfy their criteria set in advance.

In step S27, the abnormal region discrimination unit 150 discriminates a blood vessel candidate region, which is not extracted as the identical blood vessel region in step S26 among the blood vessel candidate regions extracted in step S21, to be a dotted abnormal region (such as redness or a bleeding point).

In step S28, the computing unit 200 outputs and records in the recording unit 50 the discrimination result in step S27.

Next, in step S29, the computing unit 200 determines whether or not there is an image not yet subjected to the blood vessel region discrimination processing, or a next image in chronological order. When the next image exists (step S29: Yes), the image processing apparatus 2 shifts its operation to step S20. On the other hand, the image processing apparatus 2 ends the operation when the next image does not exist (step S29: No).

As described above, the second embodiment is adapted to weight the evaluation values according to the type of organ captured in the image to be processed and the discrimination result of the image chronologically preceding the current image, whereby the accuracy of discriminating the blood vessel region can be further improved.

While the series of images recorded in the recording unit 50 are processed one by one in chronological order in the aforementioned description, the images may instead be processed in a reverse order to the chronological order. In this case, a result of blood vessel region discrimination performed on an image chronologically succeeding a current image may be read in step S24.

The image processing apparatus according to the aforementioned first and second embodiments can be realized by executing an image processing program recorded in a recording device on a computer system such as a personal computer or a workstation. Such computer system may be used while connected to equipment such as another computer system or a server through a local area network or wide area network (LAN/WAN) or a public line such as the Internet. In this case, the image processing apparatus according to the first and second embodiments may be adapted to acquire image data of the intraluminal image through these networks, output an image processing result to various output devices (such as a viewer and a printer) connected through these networks, and store the image processing result in a storage device (such as a recording device and a reading device thereof) connected through these networks.

According to some embodiments, a blood vessel candidate region group that is estimated to form a line shape when integrated is further extracted as an identical blood vessel candidate region, from a blood vessel candidate region extracted from an image, to discriminate whether or not the identical blood vessel candidate region forms the identical blood vessel region based on an evaluation value for evaluating a likelihood that the identical blood vessel candidate region corresponds to the identical blood vessel, whereby it is possible to accurately discriminate the normal visible blood vessel having the color feature data similar to that of the abnormal region such as the redness and bleeding point.

Note that the present invention is not to be limited to the first and second embodiments, where a variety of inventions can be formed by combining the plurality of components disclosed in each embodiment and variation as appropriate. The variety of inventions may be formed while excluding some of all the components disclosed in each embodiment and variation or formed by combining the components disclosed in different embodiments and variations as appropriate, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for processing an image acquired by imaging a living body, the image processing apparatus comprising:
a processor comprising hardware, the processor being configured to:
extract a plurality of blood vessel candidate regions from the image;
extract, from among the plurality of blood vessel candidate regions, a blood vessel candidate region group estimated to form a line shape when integrated, as an identical blood vessel candidate region;
calculate one or more kinds of evaluation values for evaluating a likelihood that the identical blood vessel candidate region corresponds to an identical blood vessel;
discriminate whether or not the identical blood vessel candidate region forms an identical blood vessel region, based on the evaluation values;
calculate depth information that is information corresponding to a distance between an imaging unit and a subject when capturing the image; and
calculate feature data representing continuity of the depth information within the identical blood vessel candidate region,
wherein the feature data representing the continuity of the depth information is used as the evaluation value.

2. The image processing apparatus according to claim 1, wherein the processor is further configured to
extract a predetermined number of arbitrary pixels or regions within the plurality of blood vessel candidate regions or arbitrary blood vessel candidate regions among the plurality of blood vessel candidate regions, as a candidate pixel or a candidate region; and
fit an approximate curve into the candidate pixel or the candidate region.

3. The image processing apparatus according to claim 2, wherein the processor is further configured to calculate a determination value indicating a likelihood that a pixel within the plurality of blood vessel candidate regions corresponds to a blood vessel or a likelihood that the plurality of blood vessel candidate regions corresponds to a blood vessel, and extract the candidate pixel or the candidate region from the pixel within the plurality of blood vessel candidate regions or the plurality of blood vessel candidate regions with the determination value falling within a predetermined range.

4. The image processing apparatus according to claim 3, wherein the processor is further configured to estimate a direction in which a blood vessel extends based on a direction of an arbitrary blood vessel candidate region among the plurality of blood vessel candidate regions.

5. The image processing apparatus according to claim 1, wherein the processor is further configured to discriminate, as an abnormal region, a blood vessel candidate region which is not discriminated by the blood vessel region discrimination unit to form the identical blood vessel region, among the plurality of blood vessel candidate regions extracted by the blood vessel candidate region extraction unit.

6. The image processing apparatus according to claim 1, wherein the processor is further configured to calculate feature data related to a shape of the identical blood vessel candidate region, calculate, as the feature data related to the shape, feature data based on an interval between the blood vessel candidate regions included in the identical blood vessel candidate region, and use the feature data based on the interval as the evaluation value.

7. The image processing apparatus according to claim 1, wherein the processor is further configured to calculate feature data related to a shape of the identical blood vessel candidate region, calculate, as the feature data related to the shape, feature data based on a curvature of a line shape corresponding to the identical blood vessel candidate region, and use the feature data based on the curvature as the evaluation value.

8. The image processing apparatus according to claim 1, wherein the processor is further configured to calculate feature data related to a shape of the identical blood vessel candidate region, calculate, as the feature data related to the shape, feature data representing similarity between an extending direction of the identical blood vessel candidate region and a longitudinal direction of each blood vessel candidate region included in the identical blood vessel candidate region, and use the feature data representing the similarity as the evaluation value.

9. The image processing apparatus according to claim 1, wherein the processor is further configured to detect a groove region within the image, and calculate the evaluation value based on a pixel count of the groove region in the identical blood vessel candidate region.

10. The image processing apparatus according to claim 1, wherein the processor is further is configured to calculate a plurality of kinds of evaluation values, and determine a weighting parameter given to each of the plurality of kinds of evaluation values.

11. The image processing apparatus according to claim 10, wherein the processor is further configured to determine the weighting parameter according to a type of an organ that is an imaging target captured in the image.

12. The image processing apparatus according to claim 10, wherein the image is included in a chronological image group captured in chronological order, and the processor is further configured to determine the weighting parameter based on an extraction result of the blood vessel region in another image adjacent in chronological order.

13. An image processing method executed by an image processing apparatus for processing an image acquired by imaging a living body, the method comprising:

extracting a plurality of blood vessel candidate regions from the image;

extracting, from among the plurality of blood vessel candidate regions, a blood vessel candidate region group estimated to form a line shape when integrated, as an identical blood vessel candidate region;

calculating one or more kinds of evaluation values for evaluating a likelihood that the identical blood vessel candidate region corresponds to an identical blood vessel;

discriminating whether or not the identical blood vessel candidate region forms an identical blood vessel region, based on the evaluation values;

calculate depth information that is information corresponding to a distance between an imaging unit and a subject when capturing the image; and calculate feature data representing continuity of the depth information within the identical blood vessel candidate region, wherein the feature data representing the continuity of the depth information is used as the evaluation value.

14. A non-transitory computer-readable recording medium with an executable program stored thereon, the program instructing an image processing apparatus for processing an image acquired by imaging a living body, to execute:

extracting a plurality of blood vessel candidate regions from the image;

extracting, from among the plurality of blood vessel candidate regions, a blood vessel candidate region group estimated to form a line shape when integrated, as an identical blood vessel candidate region;

calculating one or more kinds of evaluation values for evaluating a likelihood that the identical blood vessel candidate region corresponds to an identical blood vessel;

discriminating whether or not the identical blood vessel candidate region forms an identical blood vessel region, based on the evaluation values;

calculate depth information that is information corresponding to a distance between an imaging unit and a subject when capturing the image; and calculate feature data representing continuity of the depth information within the identical blood vessel candidate region, wherein the feature data representing the continuity of the depth information is used as the evaluation value.

* * * * *